US009530142B2

(12) United States Patent
Minsky et al.

(10) Patent No.: US 9,530,142 B2
(45) Date of Patent: Dec. 27, 2016

(54) METHOD AND SYSTEM FOR CREATING A MULTIFUNCTIONAL COLLAGE USEABLE FOR CLIENT/SERVER COMMUNICATION

(76) Inventors: Claudia Juliana Minsky, Santa Barbara, CA (US); Oliver Steele, Amherst, MA (US); Margaret D. R. Minsky, Amherst, MA (US)

( * ) Notice: Subject to any disclaimer, the term of this patent is extended or adjusted under 35 U.S.C. 154(b) by 1584 days.

(21) Appl. No.: 12/255,087

(22) Filed: Oct. 21, 2008

(65) Prior Publication Data

US 2009/0132943 A1    May 21, 2009

Related U.S. Application Data

(63) Continuation-in-part of application No. 12/030,724, filed on Feb. 13, 2008, now Pat. No. 8,117,089.

(60) Provisional application No. 60/889,661, filed on Feb. 13, 2007.

(51) Int. Cl.
*G09G 5/14* (2006.01)
*G06Q 30/02* (2012.01)
*G06Q 10/06* (2012.01)
*G06Q 30/06* (2012.01)

(52) U.S. Cl.
CPC .......... *G06Q 30/02* (2013.01); *G06Q 10/0637* (2013.01); *G06Q 30/0603* (2013.01)

(58) Field of Classification Search
CPC .... G09G 5/14; G09G 2340/0407; G06T 11/00
USPC .......................... 345/629, 619, 419, 420, 428
See application file for complete search history.

(56) References Cited

U.S. PATENT DOCUMENTS

| | | | | |
|---|---|---|---|---|
| 5,495,576 A * | 2/1996 | Ritchey | ......................... | 345/420 |
| 5,651,107 A * | 7/1997 | Frank et al. | .................. | 715/768 |
| 6,304,855 B1 * | 10/2001 | Burke | .......................... | 705/26.9 |
| 6,515,659 B1 * | 2/2003 | Kaye et al. | ................... | 345/419 |
| 6,668,078 B1 * | 12/2003 | Bolle et al. | ................... | 382/164 |
| 6,760,026 B2 * | 7/2004 | Li et al. | ......................... | 345/427 |
| 6,804,819 B1 * | 10/2004 | Bates et al. | ................... | 719/318 |
| 7,027,054 B1 * | 4/2006 | Cheiky et al. | ................ | 345/473 |
| 7,050,753 B2 * | 5/2006 | Knutson | ....................... | 434/350 |
| 7,096,447 B1 * | 8/2006 | Li et al. | ......................... | 716/112 |
| 7,623,697 B1 * | 11/2009 | Hughes et al. | ............... | 382/133 |
| 7,692,640 B2 * | 4/2010 | Van Geest et al. | ........... | 345/204 |
| 7,782,339 B1 * | 8/2010 | Hobbs et al. | ................. | 345/626 |

(Continued)

OTHER PUBLICATIONS

ShowMotion: camera motion based 3D design review Nicolas Burtnyk, Azam Khan, George Fitzmaurice, Gordon Kurtenbach Mar. 2006 I3D '06: Proceedings of the 2006 symposium on Interactive 3D graphics and games.*

(Continued)

*Primary Examiner* — Javid A Amini
(74) *Attorney, Agent, or Firm* — Donald R. Boys; Central Coast Patent Agency, Inc.

(57) ABSTRACT

A system for mining data about activity performed within a virtual shopping cart includes a server node for serving the virtual shopping cart and for enabling activity within the virtual shopping cart, and a module running on the server for analyzing activity performed within the virtual shopping cart and for recording results of the analysis. The activity data mined is aggregated with other data mined over time relative to the same shopping cart such that preference data related to product types, product styles, merchants, brands, colors, and sizes may be determined to help fine tune product offerings.

3 Claims, 9 Drawing Sheets

(56) References Cited

U.S. PATENT DOCUMENTS

| | | | | |
|---|---|---|---|---|
| 7,834,883 | B2* | 11/2010 | Adams | 345/581 |
| 2002/0002513 | A1* | 1/2002 | Chiasson | 705/27 |
| 2002/0055891 | A1* | 5/2002 | Yang | 705/27 |
| 2002/0113791 | A1* | 8/2002 | Li et al. | 345/427 |
| 2004/0113945 | A1* | 6/2004 | Park et al. | 345/765 |
| 2004/0246269 | A1* | 12/2004 | Serra et al. | 345/619 |
| 2006/0284791 | A1* | 12/2006 | Chen et al. | 345/8 |
| 2007/0008621 | A1* | 1/2007 | Satoh et al. | 359/465 |
| 2007/0104383 | A1* | 5/2007 | Jojic et al. | 382/254 |
| 2007/0269105 | A1* | 11/2007 | Zhang et al. | 382/165 |
| 2007/0271149 | A1* | 11/2007 | Siegel et al. | 705/26 |
| 2008/0043013 | A1* | 2/2008 | Gruttadauria et al. | 345/419 |
| 2008/0126020 | A1* | 5/2008 | Hoguet | 703/1 |
| 2008/0152192 | A1* | 6/2008 | Zhu et al. | 382/103 |
| 2009/0153552 | A1* | 6/2009 | Fidaleo et al. | 345/419 |
| 2010/0238266 | A1* | 9/2010 | Jojic et al. | 348/36 |
| 2011/0228103 | A1* | 9/2011 | Takemoto et al. | 348/187 |

OTHER PUBLICATIONS

StyleCam: interactive stylized 3D navigation using integrated spatial & temporal controls Nicholas Burtnyk, Azam Khan, George Fitzmaurice, Ravin Balakrishnan, Gordon Kurtenbach Oct. 2002 UIST '02: Proceedings of the 15th annual ACM symposium on User interface software and technology.*

Automatic camera path generation for graph navigation in 3D Adel Ahmed, Peter Eades Jan. 2005 APVis '05: proceedings of the 2005 Asia-Pacific symposium on Information visualisation—vol. 45 , vol. 45 Publisher: Australian Computer Society, Inc.*

Interactive 3D facial expression posing through 2D portrait manipulation Tanasai Sucontphunt, Zhenyao Mo, Ulrich Neumann, Zhigang Deng May 2008 GI '08: Proceedings of graphics interface 2008 Publisher: Canadian Information Processing Society.*

Modern approaches to augmented reality Oliver Bimber, Ramesh Raskar Jul. 2005 SIGGRAPH '05: SIGGRAPH 2005 Courses Publisher: ACM.*

Overview of augmented reality Ronald Azuma Aug. 2004 SIGGRAPH '04: SIGGRAPH 2004 Course Notes Publisher: ACM.*

* cited by examiner

METHOD AND SYSTEM FOR CREATING A MULTIFUNCTIONAL COLLAGE USEABLE FOR CLIENT/SERVER COMMUNICATION

CROSS-REFERENCE TO RELATED APPLICATIONS

The present invention is a continuation in part (CIP) to a U.S. patent application Ser. No. 12/030,724, filed on Feb. 13, 2008, which claims priority to a U.S. provisional patent application Ser. No. 60/889,661, filed on Feb. 13, 2007 disclosures of which are included herein in their entirety at least by reference.

BACKGROUND OF THE INVENTION

1. Field of the Invention

The present invention is in the field of e-commerce, more particularly, Web-based presentation of and interaction with an interactive store, including catalog and shopping cart utilities enabled through Web services.

2. Discussion of the State of the Art

The field of e-commerce, where it relates to online shopping, is continually being developed. In general practice, an online store comprises some Web-based presentation of available merchant products or services and a transaction-capable mechanism for allowing a user to select items and pay for those items online using a credit card or bill pay service.

The online process relates in concept to a physical shopping environment where a shopping cart is used at a store to contain items selected by the user for purchase and wherein those selected items will be "checked out" at the end of the shopping experience.

The inventors are aware of several limitations and problems in the art related to the online shopping experience. One of these is that visual representation of items provided typically by a merchant is lacking, and a conventional online shopping cart provides only a list of items that are placed in the cart. Other problems with current online store environments include a lack of flexibility for visiting multiple storefronts, while using a single utility for aggregating items for purchase (a single shopping cart). Still other limitations have been noted by the inventors, including lack of flexibility for rendering alternate views of items or arranging items into groups or categories for further scrutiny and consideration before purchase.

The inventors are aware of a system for facilitating an online shopping experience. The system among other features includes a shopping cart utility for e-commerce that includes a first workspace for retrieving and storing electronic catalog items; a second workspace for receiving specific ones or combinations of the catalog items; and a device display mechanism for displaying the items and associated item information in one of a thumbnail, collage, or list view. A user may reorder and reposition items in the collage view, and the first and second workspaces are functionally integrated. This system known to the inventors is not at present known to the public.

In the system known to the inventors the workspaces may be cross integrated between catalog or store front product window and the actual shopping cart window, while retaining full shopping cart functionality through to a pending transaction. Using this system a user may enrich the experience by being able to manipulate the area of the shopping cart as a scene or background in which images may be arranged for viewing, mixed and matched resized, replaced with available images of varying SKU attributes, and so on. Other features of this system include standalone utilization of the shopping cart independent of any one specific merchant site, and an ability to share the workspace between multiple users for editing and collaborative buying. Still other functions of the system of importance to merchants include cross sell and up sell access into the cart and an ability of offering a prefilled shopping cart, or to include suggestive items into a shopping cart based on personal knowledge of the shopper and generalized data about shoppers in general.

Still, it has occurred to the inventors that along with flexibility in utility for shopper and merchant accessibility, flexibility in design and look as well as functional improvements in image rendering and in image placement and manipulation are needed to further improve the system for truly user-friendly applications.

Therefore, what is further needed in the art is a system and method for creating and implementing a multi-functional image or collage that can itself be used to initiate and complete client/server communications including transaction processing.

SUMMARY OF THE INVENTION

The problem stated above is that more interactivity and features for online shopping utilities are desirable, but many of the conventional means for facilitating e-commerce, such as virtual shopping carts, are rather fixed in features and limited to list views of shopping cart items. Further, a shopping cart known to the inventor that has collage view capabilities and functional integration capabilities with merchant catalogs is still somewhat limited in more granular techniques that might be leveraged to make the application more user-friendly and that could further integrate a merchant's business model with actual preferences of online shoppers that use the system. The inventors therefore considered functional techniques that might be applied to an e-commerce system for online shopping, looking for techniques that promote more brand recognition for merchants, more indication of what products to offer shoppers and techniques for making the experience more affable and desirable to shoppers.

Every merchant desires a closer relationship to customers but much experimentation and investment might be made to find ways of attracting more business with little or no real improvement in the overall result over time. In the virtual shopping world, shopping carts are mostly generic in look and makeup and do not contain any personalization attributed to merchants or customers. Therefore, the act of utilizing a shopping cart has been mostly a neutral experience mostly transparent to merchants and promotes nothing in the way of relationship strengthening between a brand and a customer or any other buying emotion or sense of loyalty or excitement for the customer or the merchant.

The present inventor realized in an inventive moment that if, during active shopping at an e-commerce site using a virtual shopping cart utility, one or more techniques could be provided to increase the intensity of, or at least establish a stronger relationship between a customer and a merchant, that much opportunity for improved services would result. The inventor therefore developed a unique, interactive shopping cart that allows consumers much flexibility to expand the shopping experience, while providing merchants with more ways to reach and communicate with consumers. Techniques are provided along with apparatus to establish and to nurture a stronger relationship between a merchant and the merchant's customers through the shopping cart utility.

Accordingly, a method is provided for creating a background image for sizing and orientating images placed on the background image to present a collage of images comprising the steps (a) providing an initial background image, (b) processing the background image by adding geometry to the image, (c) anchoring image sizing and orientation executables to specific areas of the geometry, (d) linking the executables to image types to process, and (e) dragging images for processing over the background image and releasing the images at desired areas of the geometry of step (b).

In another aspect of the invention, in a virtual shopping cart shared by multiple merchants, a method for selecting a merchant brand image for dressing one or more areas of the virtual shopping cart is provided and includes the steps (a) providing a pool of merchant brand images for application to the one or more areas of the virtual shopping cart, (b) providing specific criterion for automatic selection of one of the merchant brand images from the pool of merchant brand images, (c) monitoring the state of the virtual shopping cart to determine if the criterion for selecting a merchant brand image is met, (d) selecting, according to the result of step (c), a merchant brand image from the pool of merchant brand images, and (e) serving and installing the selected merchant brand image to the appropriate area or areas of the virtual shopping cart.

According to another aspect of the invention, a method is provided for manually adjusting the transparency rate in a border region of an electronic image. The method includes steps for (a) anchoring an executable file that displays a slider control in a specific area of the border region, (b) invoking the slider to appear in display next to the image, and (c) latching a slider bar on the slider control to advance or retard the transparence effect on the border region of the image.

In one embodiment of the invention, a system for mining data about activity performed within a virtual shopping cart is provided. The system includes a server node for serving the virtual shopping cart and for enabling activity within the virtual shopping cart, and a module running on the server for analyzing activity performed within the virtual shopping cart and for recording results of the analysis. The activity data mined is aggregated with other data mined over time relative to the same shopping cart such that preference data related to product types, product styles, merchants, brands, colors, and sizes may be determined to help fine tune product offerings.

In still another aspect of the invention, a method for anchoring a transparent resizing control to an irregularly shaped electronic image is provided and includes the steps (a) specifying a criteria for determining a spot of the image for positioning the control that is consistently true for differently shaped images, (b) constructing a binary search routine for finding a pixel location conforming to the pre-set criteria, (c) executing the search routine of step (b) to identify the pixel location according to the pre-set criteria, and (d) embedding the control at the identified pixel location on the image.

BRIEF DESCRIPTION OF THE DRAWING FIGURES

DETAILED DESCRIPTION

The inventors provide an interactive shopping cart application including collage views containing interactive merchant items and controls for manipulation of those items. Techniques for using the application are taught, and system and apparatus enabling such described techniques are also described in enabling detail using the following exemplary embodiments.

Figure 1:
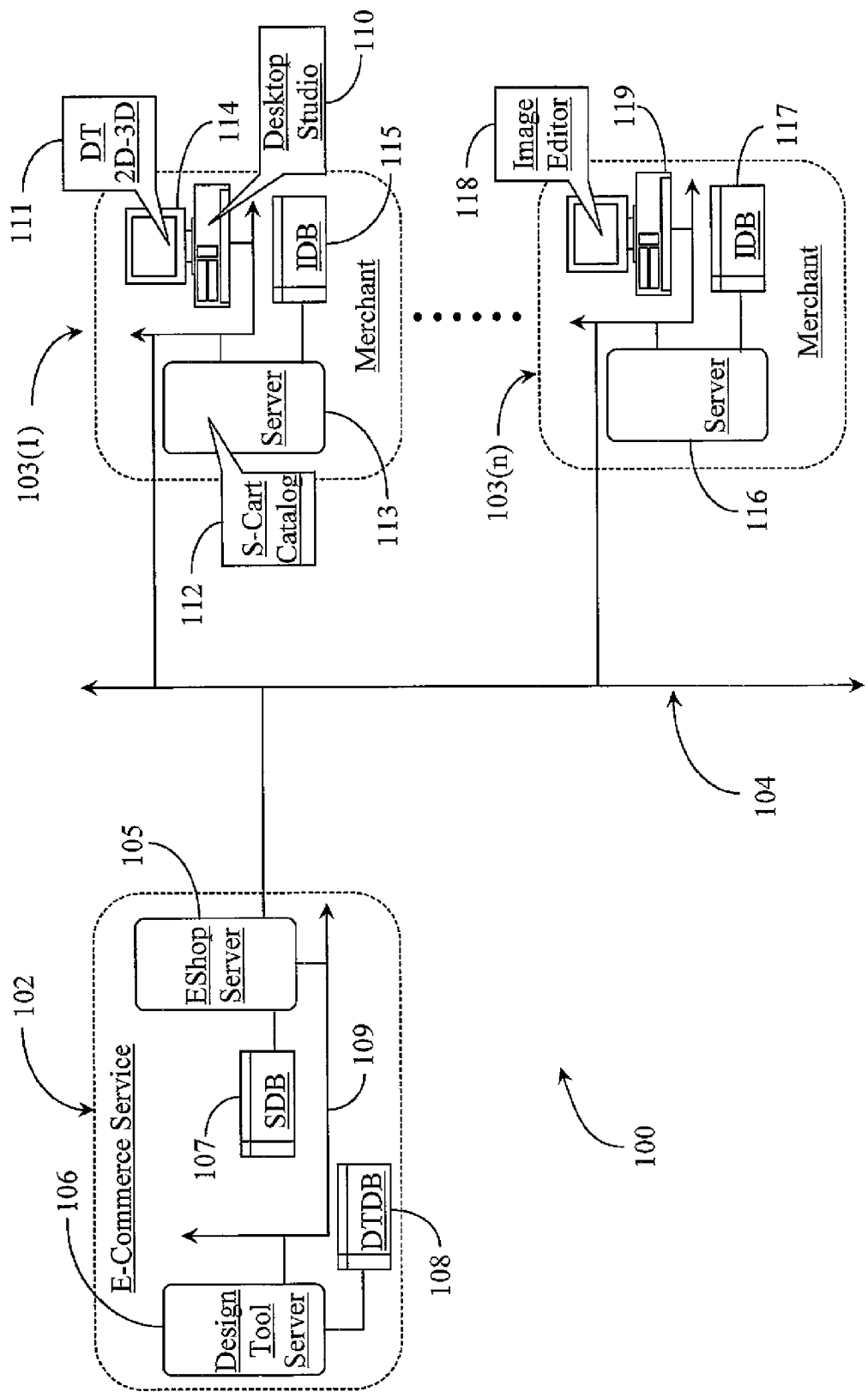
FIG. 1 is an architectural view of a data network supporting e-commerce consumer shopping according to an embodiment of the present invention.

FIG. 1 is an architectural view of a data network 100 supporting e-commerce consumer shopping according to an embodiment of the present invention. Data network 100 may be the well-known Internet network. Network 100 is more particularly exemplified by Internet backbone 104. Internet backbone 104 represents all of the lines, equipment, access points, including connected sub-networks that may make up the Internet network as a whole. Therefore there are no geographic limitations to the practice of the present invention.

An e-commerce service organization 102 is illustrated in this example and is adapted to provide consumer-based shopping services over network 100 to consumers who may access the service from any network access point using a network-capable appliance. Consumers are not illustrated in this example because this embodiment focuses on merchant capabilities and interaction with the system of the invention.

E-commerce service 102 maintains at least on E-shop server 105 connected to a local area network (LAN) 109 within the physical domain of the enterprise generally illustrated by a dotted periphery. E-shop server 105 is adapted to display Web-pages supporting integrated shopping and merchant catalog pages created by merchants offering products and services to consumers. Server 105 in one embodiment is directly accessible over Internet backbone 104 by both consumers and merchants.

E-shop server is coupled to a server database 107 adapted to store all of the required data including images and text for supporting Web services in the form of shopping cart and integrated product catalog services. Server 105 might also serve as a client interface for merchants who may subscribe to the service of the present invention and who may maintain e-shops hosted by and accessible through server 105.

Part of functionality of the present invention provided for the benefit of subscribing merchants is an ability to create their own interactive shopping pages including catalogs, product listings, and visual shopping cart applications, with which consumers may richly interact. To support this functionality, a design tool server 106 is provided within service domain 102, and is connected to LAN 109 for LAN and on-line access. LAN 109 may be assumed to be a sub-network of Internet network 104 and enjoys all of the functionality of the broader network.

Design tool server 106 is adapted to provide a variety of e-commerce design tools that may be aggregated together and made accessible through server 106 as a design studio, enabling merchants and others to log-in and create their own functional shopping cart applications Server 106 is coupled to a design tool database (DTDB) 108 adapted to store all of the required tools, markups, and code to enable online design and deployment of an e-shopping cart application integrated to merchant product listings or catalogs. In one embodiment the design services available through server 106 are kept resident in the server, requiring an online state to be maintained while using the services. In another embodiment a studio of aggregated tools may be downloaded from server 106 to merchant devices enabling merchants to configure their applications off-line and then to upload the finished pages for deployment on server 105.

In this example, there are two illustrated merchant domains meant to represent a plurality of such domains. These are a merchant domain 103(1) through to merchant domain 103( n). Merchant domain 103(1) includes a LAN-connected merchant server 113 that may serve as an image server, an application server, and an information server. Server 113 is coupled to a data repository 117 that serves as an image database facility (IDB). IDB 117 is adapted to store merchant product images used to build catalogs and product offerings. Images may also be served directly from server 113 on demand, triggered by certain activity relevant to shopping cart manipulation in server 105 within service domain 102. This may occur during general manipulation of a shopping cart application by a consumer, or as required by a merchant building a product catalog or pre-filling a shopping cart with product.

Merchant domain 103(1) includes a LAN-connected computerized workstation 114, which may be used by an agent representing the merchant to access e-commerce services from service domain 102. Station 114 may also be used to log-in to server 105 for the purpose of registering the merchant for services. Station 114 may also be used to access design tool server 106 for the purpose of using design tools or downloading a design tool application for use in offline work.

Merchant domain 103(n) is equipped similarly to merchant domain 103(1) including a LAN-connected merchant server 116 with an image database (IDB) 117 and a LAN-connected computer station 119. The functionality of each of the merchant domains is similar or identical to that described with respect to the furnishings of merchant domain 103(1). One with skill in the art will appreciate that equipment and capabilities with respect to many merchants patronizing the services of the present invention may vary significantly from one another. In one embodiment, a merchant may only be equipped with a single network-capable appliance such as a computer station with browser capabilities in order to practice the invention.

Referring now back to merchant domain 103(1), a specific design toot 111 is illustrated executing on computer station 114. Design tool 111 is adapted as a tool for preparing a background image for displaying overlaid two dimensional images as 2.5 dimensional or three dimensional images. An agent operating computer station 114 may, in one embodiment access and use design tool 111 from within server 106 in practice. In another embodiment, the agent operating station 114 may have a desktop design studio application 110 executable on computer 114 from which tool 111 may be retrieved and used. The flexibility of this arrangement enables agents representing merchants capabilities of designing their own applications online using light devices if required, or offline where the infrastructure supports robust offline graphics work.

In this example, an agent operating computer station 114 has created a shopping cart catalog, illustrated as S-Cart Catalog 112. In this embodiment, catalog 112, after being loaded to server 105, may be accessed directly from e-shop server 105 in practice by a consumer working from within a shopping cart application window integrated with the catalog. Other such integrations between a shopping cart utility and a product catalog, listing, or offering will be described later in this specification.

Referring now to merchant domain 103(n), an image editor application 118 is illustrated as executing on computer station 119. Image editor application 118 may be accessed from server 106 by an agent as part of the design tools available, or may be accessed from a downloaded program such as desktop studio 110 illustrated on computer station 114. Image editor 118 enables a merchant to take a product image and edit the image for such things as transparency presentation of the image, bounding box parameters, and for applying specific controls to the image for eventual consumer and/or system manipulation during practice of the invention. Such user-interface controls may include, but are certainly not limited to center image zoom controls, image resize controls, image view links, image orientation or view controls, image replacement controls, and image SKU editing and/or search controls. Some of these user-interface controls function to integrate the product image hosting the control to other images such as those residing in one or more product catalogs, listings or offerings.

Using the design tool services and the e-commerce services of the present invention typically requires an Internet-enabled computing appliance with command input capability and graphics display. A desktop computer or a laptop computer might be used as well as lighter devices such as a personal digital assistant (PDA), a G4 cellular telephone, or a smart phone such as a Blackjack™ or a Blackberry™ to design and deploy a shopping cart from the perspective of a merchant.

From the perspective of a consumer accessing services, the visual display of a shopping cart may include a collage of product images arranged according to preferences of the merchant or preferences of the consumer, or some of each. The shopping cart utility may be shareable over the network to those having permission to access and edit the application. The shopping cart utility may also be functionally integrated with one or more merchant catalogs, product listings, or advertisements. Versions of the utility may be downloaded as instances of the application through a file transfer protocol (FTP) server, email, or other collaboration mechanisms such as server-controlled online space shared by multiple users. There are many possibilities. A unique technique enabled by the provided design services and tools is to enable both the merchant and the consumer to build utility into a shopping cart application to serve the ends of both parties.

Figure 2:
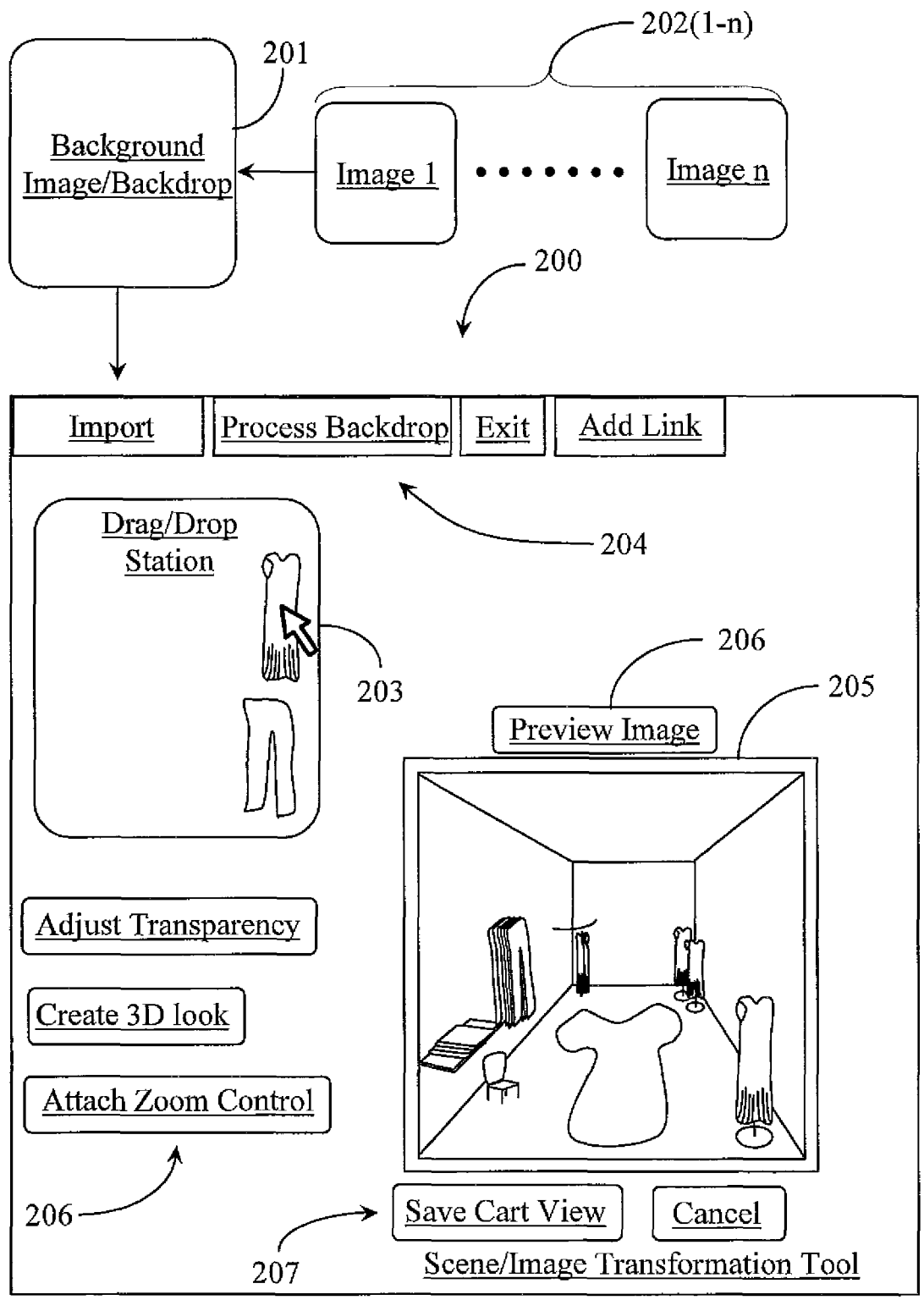
FIG. 2 is an exemplary interactive design tool interface according to an embodiment of the present invention.

FIG. 2 is an illustration of a design tool interface according to an embodiment of the present invention. Design tool interface 200 may load into a merchant browser interface as an interactive Web page served by a Web server such as design tool server 106 of FIG. 1, or it may be called up from a standalone local program provided as a downloadable installation, or one purchased off-the-shelf and installable through removable medium such as a Compact Disc Read Only Memory (CD-ROM) or by some other compatible memory device.

In this example interface 200 is displaying a scene/image transformation tool for preparing a background image for the addition of two dimensional image overlays that will be made to look like 2.5 dimensional or three dimensional images. For the purpose of discussion, interface 200 will also be referred to herein as an image transformation tool or simply transformation tool 200.

In a collage view of a shopping cart application, a user may take a background image or backdrop scene and prepare that image for depth perception properties by adding one or more perspective view planes and by application of sizing scale along the depth of the plane that can be activated to resize an image that is placed over the backdrop according to where along the view plane the image is positioned.

Interface 200 has an interactive import function (one of interactive options 204) for enabling a user to import a background image or "scene" into the application for editing. A background image or backdrop image is illustrated herein as an image 201. Importing a backdrop may include a function enabling the user to browse an image store or other repository for a desired scene. Backdrop 201 will become the background of a shopping cart collage view.

Another of interactive options 204 is provided for initiating processing of the backdrop image to prepare the image for depth perspective and resizing capability. In processing of the backdrop image, a user creates polygons, presumably rectangular, on the image to establish a three depth perspective. In general, the perspective may be created using four polygons representing opposite walls a ceiling and a floor as is illustrated in this example. One with skill in the art will recognize that other viewing geometries might be considered. Generally speaking, the backdrop may appear in the interface in a preview window 205 that may be activated or opened by interacting with a preview image option 206. The background image (201) in this case may be cropped and manipulated with other image editing tasks before it is processed or while it is being processed.

Scaling and perspective transforms are applied geometrically to the background image and are executable such that when an image is placed on the background image, it is affected by the transforms according to the created polygonal geometry in the background image. The transforms affect how an image will appear as it is dragged across the geometry of the backdrop image.

Import function (204) may also be used to collect product images for overlay over the background image thus creating a collage view. This view will ultimately be what is seen in the shopping cart window of the shopping cart utility. In this example a user, presumably an agent of the merchant, is creating a collage view using product images that the merchant wishes prospective customers to see when they click on "shopping cart" or "add to cart" when they are shopping at the merchant's store front. Therefore, one option for the merchant is to offer a customer a shopping cart utility that has an attractive backdrop and tastefully arranged product images that the customer might accept or keep in the cart for checkout.

A merchant may import any number of images 202(1-n) representing products that the merchant wishes to offer for sale to the customer. Images 202 (1-n) may also include decorative images that do not represent products but may be used to "spruce up" or to "decorate" the backdrop. A backdrop image such as image 201 may represent a room such as a bedroom, a ballroom, a changing room, or some other room that may be "themed" appropriately according to the types of product images that will be added to the scene. Decorative images may include furniture, fixtures, mirrors, flower arrangements, rugs and other props. Background images may also represent the out-of-doors like a beach background or a river trail, or some other nature inspired-image. Abstract art scenes or product branding designs can also be used as background images. There are no limitations to the variations that can be used in terms of images or themes.

Interface 200 includes an image drag and drop station 203 in this embodiment. Drag and drop station 203 may be thought of as a staging area that represents visually the imported images 202 (1-n) that may be used to create the collage view. Window 203 is linked to preview window 205 by object linking and embedding (OLE), which is the basis for the drag and drop utility known to the inventors, and generally to all computer users. Using drag and drop a user may take an image from the drag and drop station 203 and position it somewhere over the previewed representation of the collage background using normal computer input functions. Images may be moved from one window to another or they may be copied and pasted from one window to another. An image representing a dress and an image representing a pair of trousers are illustrated in window 203.

Both of the above-mentioned images have been added to the background scene illustrated in preview window 205. For example, an image of the dress is positioned near the right wall of the room more to the front of the room. The geographic placement of that image results in the current image size. In this view an image prop (dress stand) is provided as a decorative image that has been engineered to accept installation of the dress image. Further back along the same wall, the same image (replicated) is illustrated on the same dress stand. However, because of the scale transform, the additional images are notably smaller because appearing further back in the collage or further away from the horizontal view plane or surface of the scene. In the rear left corner of the image from the perspective of one viewing the image, two of the same dress images are illustrated with another prop, a corner dress hangar. In that view, the images are mirrored 180 degrees from the dresses along the right wall and are sized just smaller that the dresses appearing on the dress stands at the back of the right wall of the room.

The trousers are illustrated hanging (several pairs) on the left wall about halfway along the depth perspective resulting in automatic sizing. The images are also flipped 180 degrees from the original orientation of the trouser image for effect. Decorative props, such as a chair illustrated within preview window 205 may be activated to accept dress images, for example, that may be caused to appear to be draped over the chair if a user drags the image over the chair. As a decorative image, the chair "recognizes" the "dress image" and may utilize image processing utilities from a system standpoint to enable the "dress image" to be visually "draped over the back of the chair". In this example, no dress images or other product images appear draped over the chair.

Another decorative image that may be a key "support" image is shelving provided against the left wall of the image background closer to the front of the background image. On the shelf are some folded clothes that may very well include other merchant items such as even folded pairs of the trousers or towels or the like. A rug in the middle floor of the room also contributes to the warmth of the collage and to smart image positioning within the graphics window. Items may be removed from window 205 and discarded or placed back into window 203.

Source images 202(1-n) may or may not be preprocessed to work with certain functions built into the graphics editor. For example, resizing an image or reorienting an image requires no source image preprocessing. Likewise, simple draping or folding of an image may be accomplished with an image slicer invoked by an embedded executable associated with a decorative image like a chair for example. In such a case, an unprocessed source image can be brought near the chair and the executable will slice the image so that it may be draped over the back of the chair, for example. However, in one embodiment source images may be enhanced with more than one view or "look" that may be called up by an executable embedded within the image. For example, a jacket may have a hanging look, a draped look, and a folded look. Each one of these looks can be a separate image that is invoked dependant on where in the background the image is placed. If the jacket is brought near the hangar, the hanging look image appears. If the jacket is brought near the table, the folded look appears and so on. Therefore a source product image may be one that actually links more than one separate image to a mobile image placeholder.

Interface 200 includes interactive options 206 which, when invoked, call up other graphics editing tools. An option 206 for adjusting image transparency is provided although it may be assumed that source images staged for application to a background image to make a collage already have transparent border regions by default. An option 206 is provided for creating a three-dimensional look to a single source image. This option may be executed on any single image to produce a three-dimensional image that can be rotated to illustrate the various angles of the product. There are three-dimensional programs that exist in the art for computing a three-dimensional image from a two-dimensional image. This feature may apply to any image element, and the transformation may be automatic depending, for example, on image placement by the consumer.

In one embodiment, an interactive option 206 for attaching a center zoom button to a source image is provided. A zoom control is a control that is invoked when a user mouses over the control on the image to make it visible. The user can then manipulate the control such as pressing down on the control to zoom the image gradually or incrementally until the desired size is achieved. In one embodiment the zoomed version of the image, if the image is already positioned on the backdrop, may be viewed in a separate window or as a floating representation of the anchored image.

Interface 200 includes an exit option (204) for exiting the application and an add link option that may be used to add a hyperlink to a source image 202 (1-n) or to the background image 201. For example, a hyperlink on a dress may be provided to enable the user to navigate to a page that provides more information about the dress and shows models wearing the dress, etc. A hyperlink may be used to introduce a cross sell item or to add accessories to an item. There are many possibilities.

Interface 200 includes interactive options 207 for saving a cart view (shopping cart collage) or for cancelling the current preview image. If a collage view is saved, it can be the basis for an interactive shopping cart that can be edited by a customer. A collage view may be "prefilled" by the merchant and presented to customers. In one embodiment, pre-filling may be done based on information known about a specific customer where the merchant may receive suggested product images from the system for application to the background image. In some cases, the system may even suggest the type of background image that is best for a specific customer. Such an application might be useful in providing the best shopping experience for a customer short of walking into the boutique and having an assistant suggest items for purchase.

In one embodiment, a collage view includes a themed backdrop over which some division of space exists between the product display area and accessible merchant catalog or product listings. Such a themed backdrop may be created in the form of an abstract concept or a fantasy view. In the case of an abstract concept, a designer sketch book might be illustrated as a backdrop image where the left side separated from the right side by a graphic representation of a spiral binding might be the merchant catalog showing products and product descriptions, and the right side of the image is the shopping cart space. A customer can therefore browse the merchant side and select items and drag them into the collage view for positioning or arranging them according to a desired view.

In one embodiment, a fantasy theme might be created as a sort of style cart window dressing with respect to a background image. For example, a 1960's store front design might be incorporated as a two or three-dimensional scene in which a customer might view cataloged items and description in one corner window display and be able to add products to an adjacent window display which is the actual shopping cart collage space. The actual division between shopping cart space and product listing or catalog space may be very vague when looking at the image or window as a whole. The boundary might be some decorative image such as an escalator, a dividing curtain, a wrought iron rail, or any other representation.

In one embodiment, the merchant catalog might be provided as an embedded program that is virtually hidden in the shopping cart window, like, for example, as a book sitting on a table. When a user clicks on the book, a catalog window containing one or more catalog pages might come into view so that a user may easily browse the catalog without leaving the shopping cart. Again the customer can add or remove items from the shopping cart and can mix and match or arrange items as previously described.

It is noted herein that a merchant may elect not to provide pre-filled shopping carts by adding source product images to a collage view (shopping cart). For example, a merchant may simply create one or more useable background images that a customer may select from when they open a shopping cart utility. In this case, the customer fills the cart space using the source images provided by the merchant. In some embodiments, the customer may also have some design capabilities and even access to one or more compatible design tools for making changes to a merchants design and perhaps republishing the design. If customers prefer the new window dressing authored by the customer, the customer may be rewarded with a discount of some kind. In this way customers may be motivated to contribute to the merchants efforts to understand what the customer in general would like to see and interact with in the way of a useable shopping cart utility.

Figure 3:
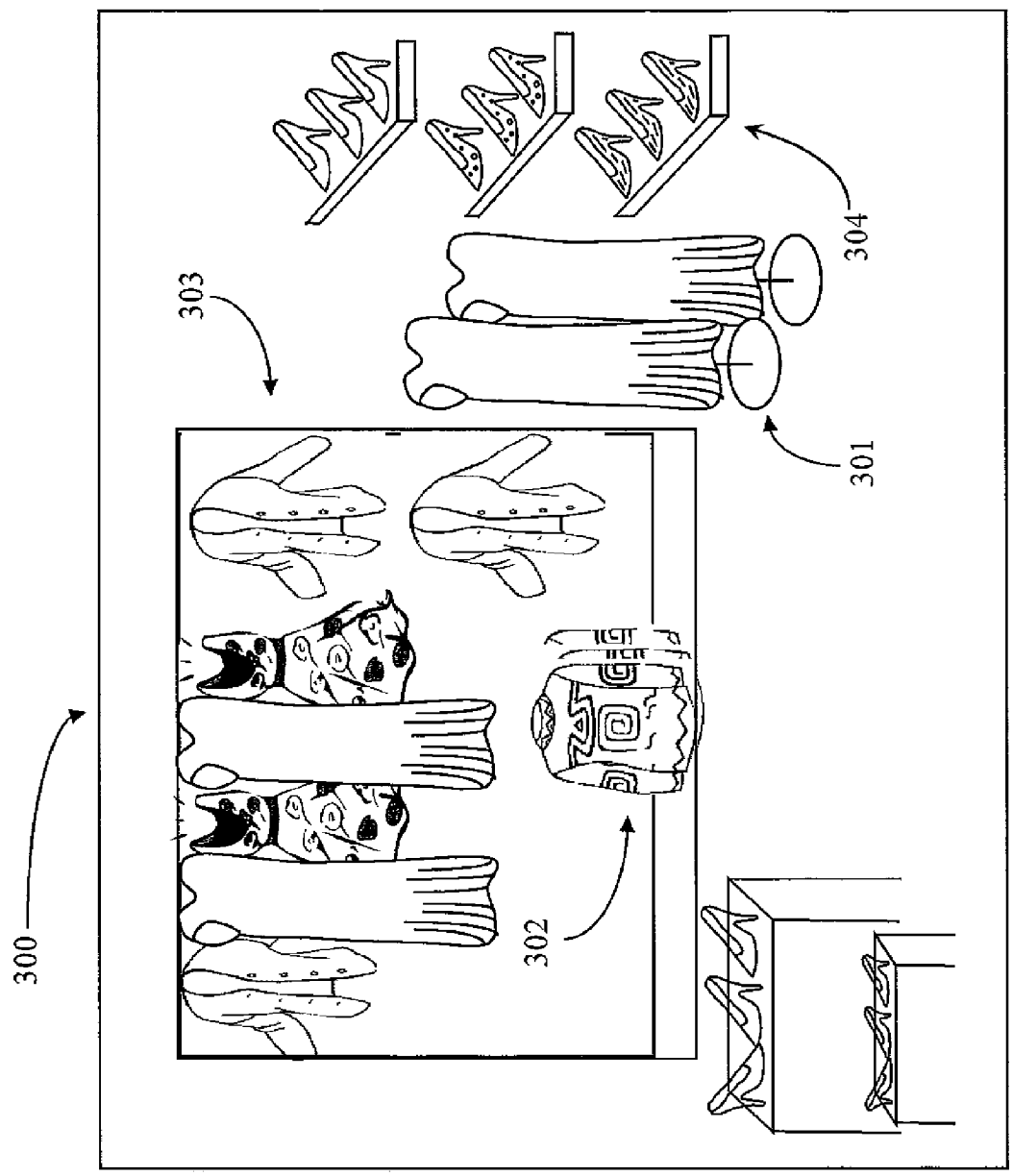
FIG. 3 is an artist rendition of a shopping cart collage created with the design toot of FIG. 2.

FIG. 3 is an artist's rendition of a shopping cart collage 300 created with the design tool of FIG. 2. In this view, a simple boutique room is recreated with decorative items and source product items. There are dresses 301 arranged on dress stands and individual pairs of shoes 304 arranges on wall shelves. A stack of sweaters 302 is arranged on a table and multiple items 303 are positioned hanging in a back room.

Several decorative images are used in this example, like a picture frame leaning against the right wall in the image. A single shoe is positioned on a table at the front of the boutique. Couches, chairs, tables, ottomans, and other boutique decorations may be provided. In one embodiment customers are enabled to edit remove or replace decorative images in the collage view.

Figure 4:
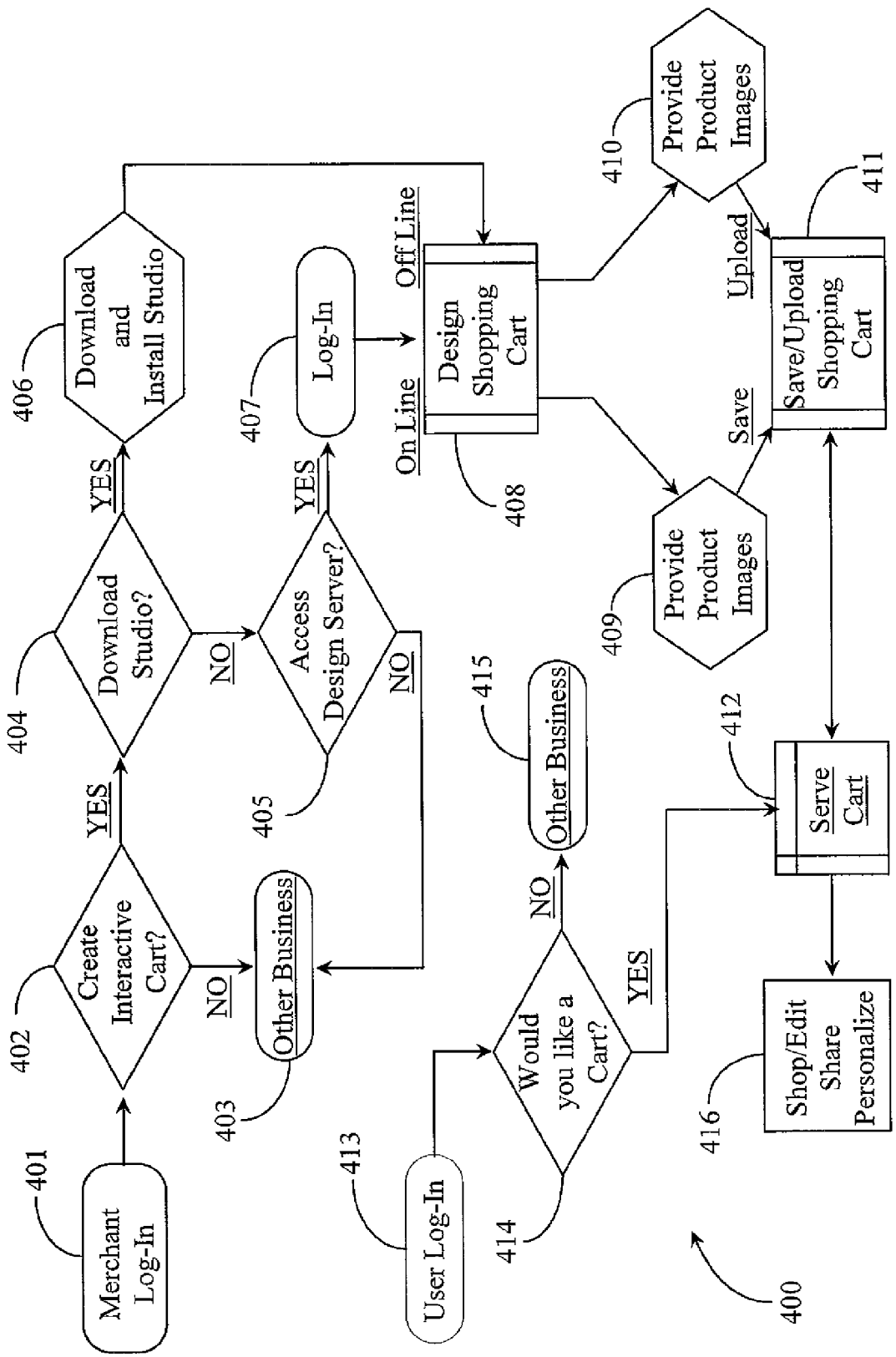
FIG. 4 is a process flow chart illustrating steps for creating and serving an interactive visual shopping cart according to an embodiment of the present invention.

FIG. 4 is a process flow chart illustrating steps 400 for creating and serving an interactive visual shopping cart according to an embodiment of the present invention. At step 401, a merchant logs into a server that enables access to the design tools for creating a shopping cart view as described in various embodiments above. At step 402, the merchant makes a decision to create an interactive cart or not. If at step 402 the merchant did not intend to create a cart, then the process may move to step 403 where the merchant may have intended to transact some other piece of business relative to subscribed services.

At step 402, if the merchant intends to create a shopping cart collage view for use in an interactive cart, at step 404 the merchant may be provided with an option for downloading the required tools in the form of a desktop studio. If at step 404 the merchant decides not to download the studio, then the merchant may be prompted to access a design tool server analogous to server 106 described with respect to FIG. 1 above. If the merchant declines at step 405, then the process may resolve back to step 403 "Other Business".

Back at step 404, the merchant has the option of downloading the design tools in the form of a design studio. If the merchant decides to download the design studio as a desktop application, then at step 406 the studio application is downloaded and installed on a computing device subsequently used to create a shopping cart collage. The merchant can then take the process off-line and may design shopping carts using the studio and merchant source images at step 408. At step 410 the merchant supplies the product images and descriptions that will be represented in the shopping cart view. In this step, decorative images may also be provided and applied to the collage view.

It is important to note herein that the design studio may not contain all of the tools to create a complete shopping cart utility. The design studio focuses on the graphics editing tools required to create the desired "collage view" used in a shopping cart window at minimum. Several views may be created and used in a shopping cart "template utility" if desired. However, much of the interactive functionality for customer interaction may be created using the design tools described and catalog integration features may also be enabled by the design tools of the present invention.

At step 411, the merchant may save the shopping cart design and may upload the cart view to the appropriate server such as e commerce server 105 for integration into the merchant's store front. More than one version of a cart may be uploaded and provided to consumers. Carts may be offered prefilled or empty for customer filling. Various generic scenes may be presented which customers might edit and customize to their satisfaction.

At the location of the service the cart may be served to one or more customers on demand at step 412. The cart may be served, for example, after a user (customer) logs into the e-commerce server at step 413 and is prompted at step 414 to determine if the shopper is ready for a shopping cart. The cart may be served upon a positive response to the prompt. If a user does not want a shopping cart at the time of login, then the process from the perspective of the customer may skip to step 415 "Other Business".

After a cart is served at step 412, the user or customer may shop, adding items to and removing items from the shopping cart at step 416. In this step a customer may also edit, share and personalize the cart. In one embodiment, the shopping cart may be used at multiple separate store fronts hosted in a same server or in different servers. A cart might be emailed to a customer as an advertisement, such that when the customer clicks on the cart while connected to the Internet it opens one or more store fronts or catalog pages from which the user may select products. When the user is finished shopping, the user may, from within the cart, proceed to checkout. In one embodiment, if a user accepts all of the products offered in a cart that has been prefilled by a merchant, the user may click on the cart and immediately proceed to checkout. Expiration dates may be placed on items within a prefilled shopping cart such as in a weekend sale or some special time sensitive discount offer.

Back at step 405 if a merchant decides to access the design toot server, then at step 407 the merchant may log into the design tool server. In this branch of the process the merchant remains online and uses the server tools to design one or more shopping cart views at step 408. At step 409, the merchant may provide the product images and may pre fill one or more collage views for a shopping cart utility as described previously in the off line branch using the downloaded studio. At step 411 online, the cart may be saved for service. The process from the customer perspective resulting in shopping cart service at step 412 is the same.

One with skill in the art will understand that there may be more or fewer steps 400 provided in this example and in varying orders depending on design and service rules. For example after a user logs in to an e-commerce site (typical customer registration), a user might not be prompted to access a shopping cart (step 414). Rather a cart might automatically appear when needed such as immediately after a user clicks on "add to cart". In another case a user may select a prefilled cart containing suggested products or an empty cart that the user may fill.

Provision of product images by merchants can be by utility of the service of the invention where images are pre-submitted to the service and organized into some catalog format, or they may be held in a server local to the merchant and served when required. Interactive merchant catalogs may be integrated with the shopping cart utility as previously described in various ways having various looks.

Figure 5:
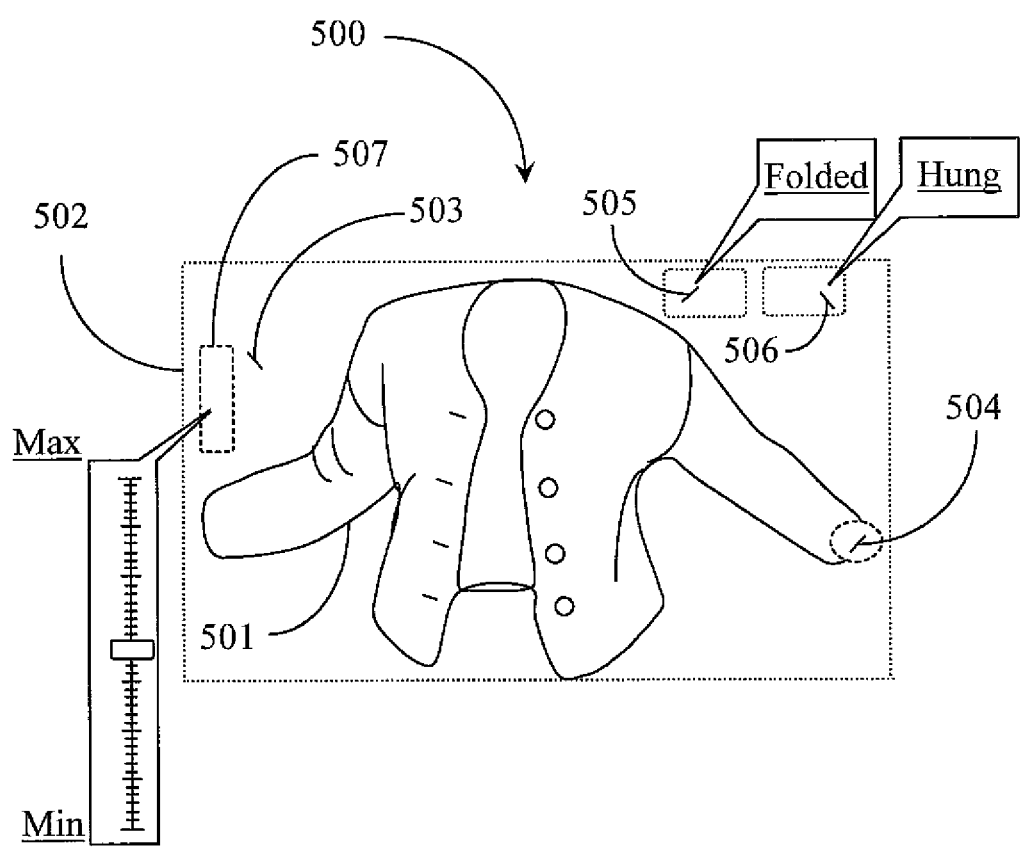
FIG. 5 is a front view of an image having interactive user controls according to an embodiment of the present invention.

FIG. 5 is a front view of a display 500 having interactive user controls according to an embodiment of the present invention. Image 500 represents a merchant-offered product that might be displayed as a catalog image. In this example, the image has a variety of controls embedded into the image or into the image bounding box or border region 502. The image is of a jacket 501 which is an irregularly shaped object.

A transparency control 507 is provided in this example and is adapted to enable a user to adjust the transparency in the border region using a graphic slider control. When to a user mouses over control region 507, an interactive slider graphic appears that can be manipulated using a mouse or by keystroke or cursor movement. The slider has a slider bar and a range from minimum transparency to maximum transparency. In one embodiment, a similar control may be used to achieve a color hue adjustment for the border region, for example, adjusting the region color to exactly match a background color thus achieving a transparent effect for the border region in another way.

Border region 502 of image 500 also supports interactive links 505 and 506 that point to other versions or looks for image 500. For example, control 500 may be invoked to view a folded version of jacket 501 and control 506 may be invoked to view a hung version of jacket 501. In one embodiment discussed further above, controls 505 and 506 are provided for automatic system invocation when a user drags the image with the controls from the catalog into a pre-designed background scene for a shopping cart window. If a user drags the image near a decorative image in the scene such as a table, link 505 may be invoked causing a folded jacket 501 to appear on the table. When the user drags the image closer to a hangar, link 506 maybe invoked causing a hung version of the image to appear.

Image 501 includes a zoom feature 504, which may also be a resizing control with or without a zoom feature, anchored in the actual image at the lower rightmost pixel region of the image. A method for finding such a region in an image may be provided wherein a binary search is conducted in the background to locate the correct anchor position for a more reliable anchor of the zoom control/resizing control feature. Invocation of control 504 may cause a zoom button or resize button graphic to appear which a user may manipulate to gradually zoom in or zoom out the image or resize the image to a specific size. The zoom feature of the control may also be adapted to zoom specified portions of the image such as an image label, artistic stitching, perceived flaw, or other features present in the image.

In one embodiment, images like image 500 including the controls are limited to catalog or product list displays. A user browsing the catalog may view several different views of an image; zoom in or zoom out on the image; rotate the image; invert the image; adjust transparency of the image; produce a mirror image; see the SKU of the product; and so on. The catalog image then may be fully enhanced for user interaction. When a user selects to add the product to a shopping cart, a simplified image containing fewer or no controls may be served into the shopping cart. In another embodiment all of the user interface controls present in the catalog display may also be transferred with the image into the shopping cart allowing full user interaction with the image while it is in the cart. Some controls may be reserved however, for catalog interactivity.

In one embodiment, an image representing a merchant product may be an animated image like an executable picture animation. Likewise a decorative image in a collage background or backdrop might also be an animated image. For example, a carrousel may be provided that can be used as an anchor on which to hang clothing items represented by merchant product images. When activated by a user or some other trigger, the carrousel may spin with the hung clothing items rotating around the carrousel. A product image like a dress, for example, can be animated to mimic a breeze blowing though a background scene that may be an open airy boutique. Other animation controls and effects may be provided for both decorative images and product images.

In one embodiment, music may be piped into a shopping cart window in a way that may enhance the customer mood or make the customer emotionally more inclined to purchase items. Animations may also be provided as part of a background scene such as waves on a beach or trees swaying (out of doors scenery). At any time during the experience of a user, a shopping cart may be converted into one that displays a text listing of products that are contained within the cart. Some product images may blend in so well with the background image of a collage view of a shopping cart that a user might have some difficulty remembering that it is a product for purchase and not a decorative image of the background. Therefore being able to toggle between list and collage views is a valuable feature from the customer standpoint.

Figure 6:
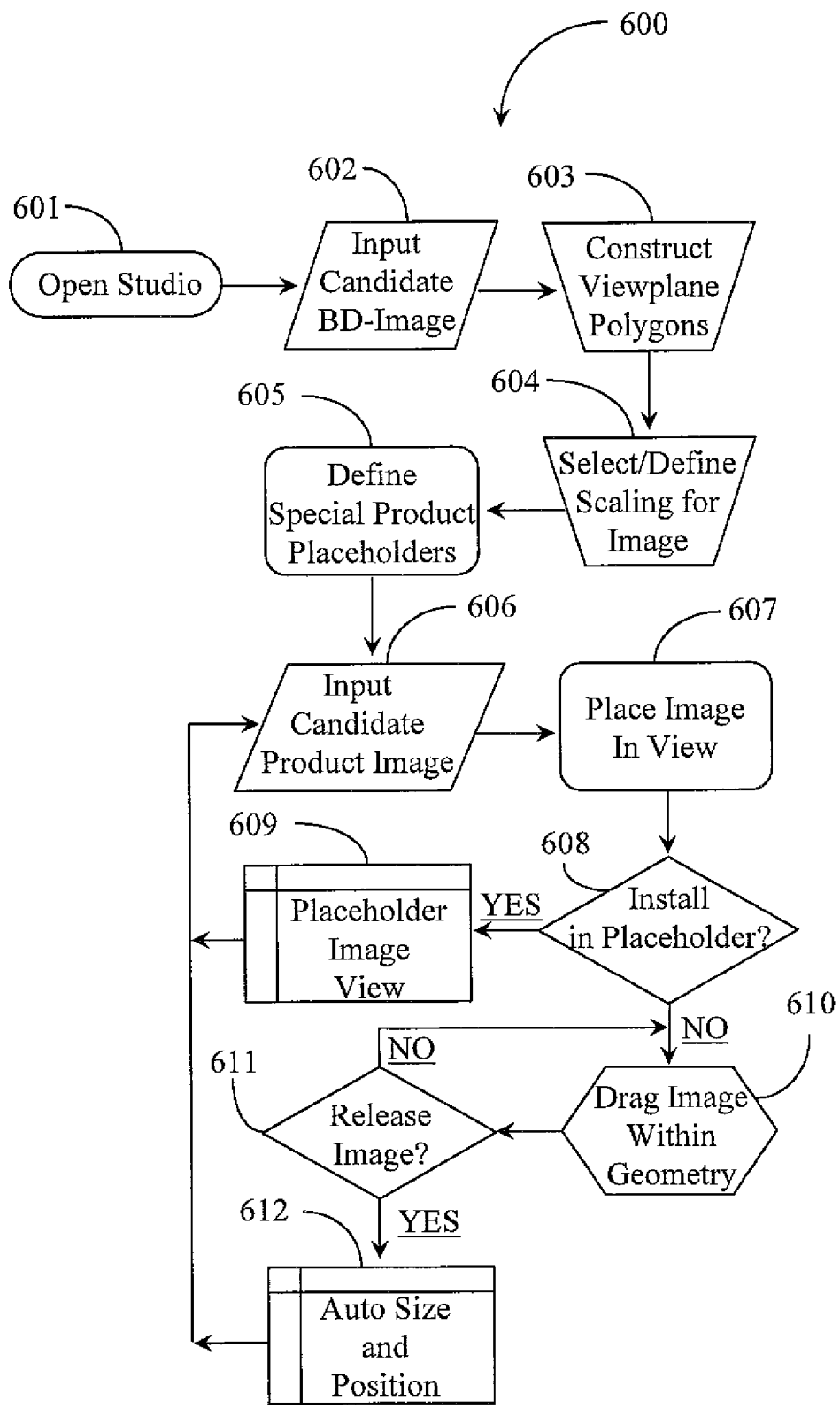
FIG. 6 is a process flow chart illustrating steps for creating a visual container for representing two dimensional images as three dimensional images with automatic orientation and sizing.

FIG. 6 is a process flow chart 600 illustrating steps for creating a visual container for representing two dimensional images as three dimensional images with automatic orientation and sizing. At step 601*a* user opens the studio application or logs into and accesses design toots hosted in a Web-based server. At step 602, with the designer interface open and the image transformation tool accessed, a user may import a candidate backdrop (BD) image.

At step 603, the user constructs polygonal geometries to establish one or more view planes in perspective to illustrate depth. At step 604, the user selects or defines scaling for the view plane longitudinal axis or generally from front to rear in the scene.

In one embodiment, at step 605, a user may define special image placeholders within a background image such as on decorative images and props. These special placeholders might be used to call special product image transformation according to the rules associated with the placeholder. For example, a jacket may be defined by an image placeholder as a folded version of the jacket draped over a rail or the back of a chair for example. At step 606, a user may input a candidate product image for placement into the shopping cart. At step 607, the candidate image is placed into a viewing or previewing window.

At step 608, the user may install one or more special images into special place holders over the background image. If at step 608 the image is to be installed in a placeholder at step 609 the shopping cart has a placeholder inspired image view. The process may loop back to step 606 for image input and may proceed accordingly.

At step 608, if the user decides not to install images in placeholders, the image may simply be dragged into the geometry at step 610. In this step a user may drag an image all over the background scene to view the different ways to display the image in the collage view. At step 611 it is determined whether or not to release the image. If the image has not been released at step 611, then the process resolves back to step 610 until the image is finally released. The released image in the most simplified example maybe immediately sized and positioned at step 612 and the product image takes a place within the image collage. The process may resolve back to 606 from step 612 for the next candidate image that may be imported.

Special image placeholders may be anchored or embedded in a background at logical points such as within or adjacent to decorative images of furniture or the like. The placeholders may contain universal resource indicator (URI) data for locating specifically stated and configured views of catalog images like a folded view or the like. In one embodiment, generic system-designed backdrop templates are offered by the service for merchant or consumer interaction and final disposition.

Figure 7:
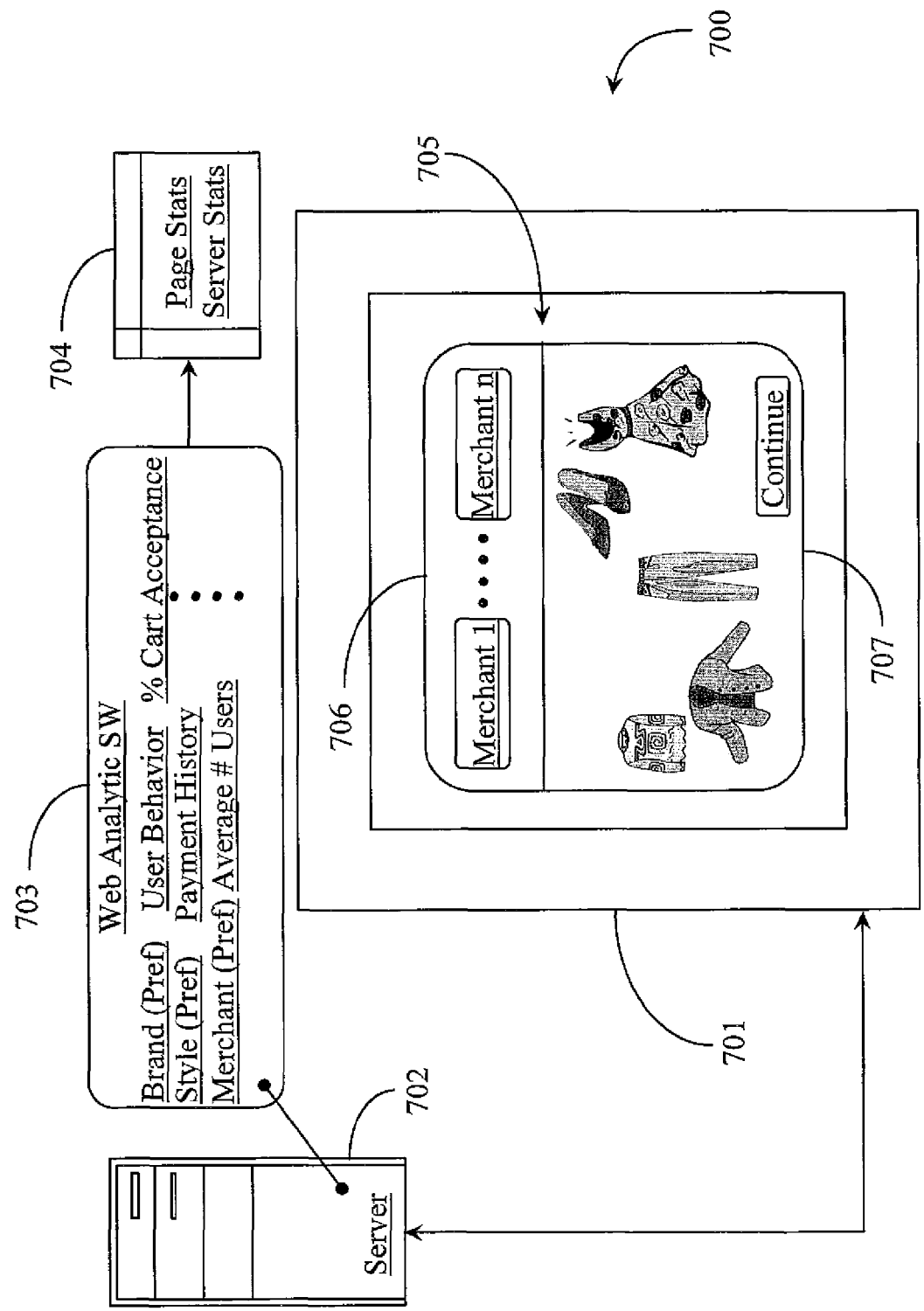
FIG. 7 is a block diagram illustrating a single page shopping cart application integrated with analytics software.

FIG. 7 is a block diagram illustrating a single page shopping cart application 705 integrated with analytics software 703. Client/Server architecture 700 is illustrated in this example and includes a user computer display 701 of a client computer networked to a server 702. Monitor 701 includes an interactive screen display of an integrated shopping cart application 705. In this example application 705 includes a shopping cart collage window 707 and a multiple merchant catalog resource 706.

In this example, merchants, having catalogued products represented by images, include merchant 1 through merchant n or any number of merchants. Several images are already loaded into shopping cart window 707 as previously described. Either those images were imported manually by the user or inserted as a system default.

Shopping cart 705 is implemented through a Web page on which server 702 may monitor user activity and other parameters. As a user or multiple users interact with cart 705, server 702 tracks their movements, page navigations, and data input into the server.

Web-based analytic software (SW) 703 runs on server 702 and provides the tracking features and data categories mined for statistics eventually used by the system to improve the service and add new features. SW 703 may be able to determine brand preference in a shopping cart to determine, for example, which brand does the cart carry most or at one time. The tracking software can look for preference patterns for style. For an application using multiple merchant catalogs, SW 703 may be able to determine if a preference for a particular merchant exists.

Other parameters that might be tracked and analyzed by server 702 aided by SW 703 might include user behavior, user payment history, and number of users having access to the shopping cart whether through permission or other authorization. Still another parameter that may be tracked in the case of a prefilled shopping cart presented to a user might be a percentage of users who actually accept the items in the cart without deleting any of them.

As a user operates within cart 705, SW 703 aggregates server data about that same interactive Web page according to the listed data categories. In one embodiment, this may be performed on behalf of a single individual or on behalf of multiple individuals. The data aggregated is converted into useable page stats and server stats (if desired) and is stored in a portion of data repository 704 adapted for the purpose. Stats 704 may be retrieved at a later time and used to help refine the system and to make the user experience more rewarding. Web page analysis of shopping cart 705 may be an ongoing process conducted over multiple uses of the shopping cart, wherein patterns emerge over time that indicate certain style preferences, product brand preferences etc. as described further above. Some stats may be collected generally for all consumers who use an instance of the shopping cart. Stats may also be analyzed from page to page as a user shops multiple storefronts with the same cart.

Having useable statistics regarding user preferences in brand and style help merchants to decide on what items should be presented to users on sale or as a cross sell item or in general in a prefilled shopping cart. Cart acceptance figures can be calculated over many users over a period of time. A merchant can experiment with product offerings to customers to try to improve the statistical average percentage of acceptance. A more granular application of this process may be provided for determining what an average rejection rate is or average accepting rate for any one item preplaced in a shopping cart over multiple users over a period of time. It will be apparent to one with skill in the art that many other statistical categories may be mined for data.

Figure 8:
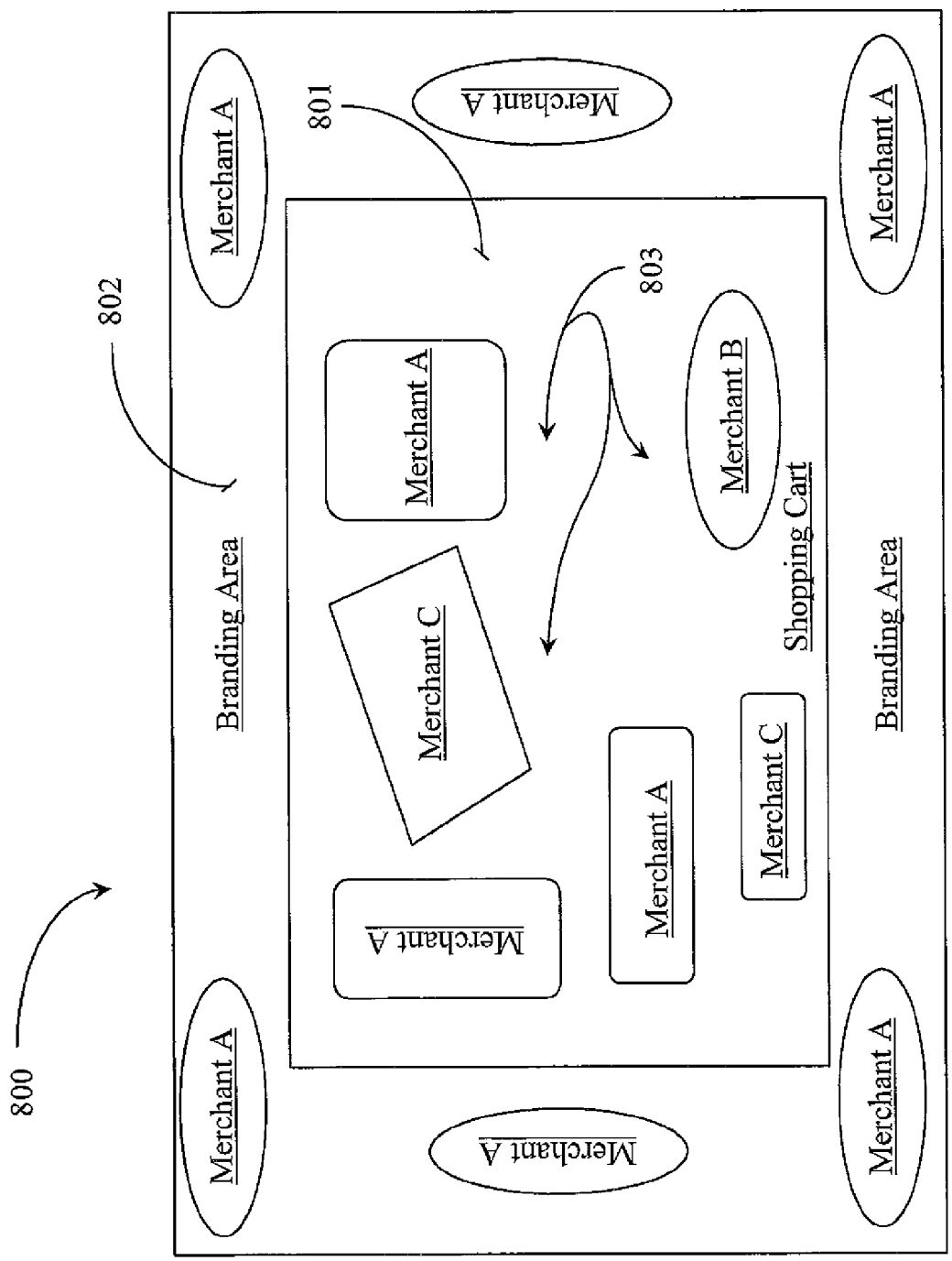
FIG. 8 is a block diagram illustrating merchant branding of a shopping cart view based on product content.

FIG. 8 is a block diagram illustrating merchant branding of a shopping cart view 800 based on product content placed into the cart. View 800 is exemplary of a shopping cart collage relative to a shopping cart utility shared by multiple merchants from the perspective of product sales. A consumer may select products offered by various participating merchants and place those products into the cart space, which is a collage in this example.

Such a cart view may be portable and more than one consumer may participate in loading the cart with merchandise. Consumers may collaborate with each other and the view may be shared by email or other methods such that any of the contents may be edited or removed and new products from the various merchants may be added to the cart.

Cart view 800 includes a branding area 802 that may carry a merchant brand or skin. Branding area 802 surrounds a shopping cart collage space 801 like a frame in this embodiment. There are multiple products 803 that have been added to cart 801 including products sourced from three different merchants. For example, three products in cart 801 are associated with merchant A. Two products in cart 801 are associated with merchant C. A single product in cart 801 is associated with merchant B.

In this example, branding area 802 may be dynamically changed from a brand representation of one merchant to a brand representation of another merchant based on some competitive state such as in the case of this example, the quantity of items in the cart that represent a merchant. In this case, merchant A is more heavily represented in cart space 801. Therefore, merchant A commands the branding area of the cart. Representation may be based on number of items in the cart for each merchant or the total value of the items in the cart for each merchant, for example.

In this way, merchants compete with one another for the right to dress the branding area of the shopping cart while it is being interacted used. If the cart is distributed to more than one consumer, the branding area becomes an important tool to gain recognition for particular product brands or names. The branding area skin or dressing can be dynamically changed whenever the cart is activated and being used. A simple accounting of merchant items in the art performed periodically or as products are added and removed from the cart can trigger the selection process of the appropriate merchant skin from a pool of merchant skins. The switch may occur at any time that it is determined that a single merchant has more items in the cart or has a higher value of product in the cart. A tie breaking routine can be added if two or more merchants have the same number of products in the cart.

In other embodiments where the cart might be shared by more than one merchant, auctioning for brand space may be permitted. In still other embodiments, a winning merchant might be permitted cross sell space as well as the branding rights to the shopping cart. In one embodiment a merchant (agent) may order a real time "cart view" of a shared shopping cart that is being edited by a user, wherein the view shows the agent only the correct items of that merchant arranged in the cart for purchase by the consumer. Such a view might be ordered through a tool bar option or browser plug-in.

Figure 9:
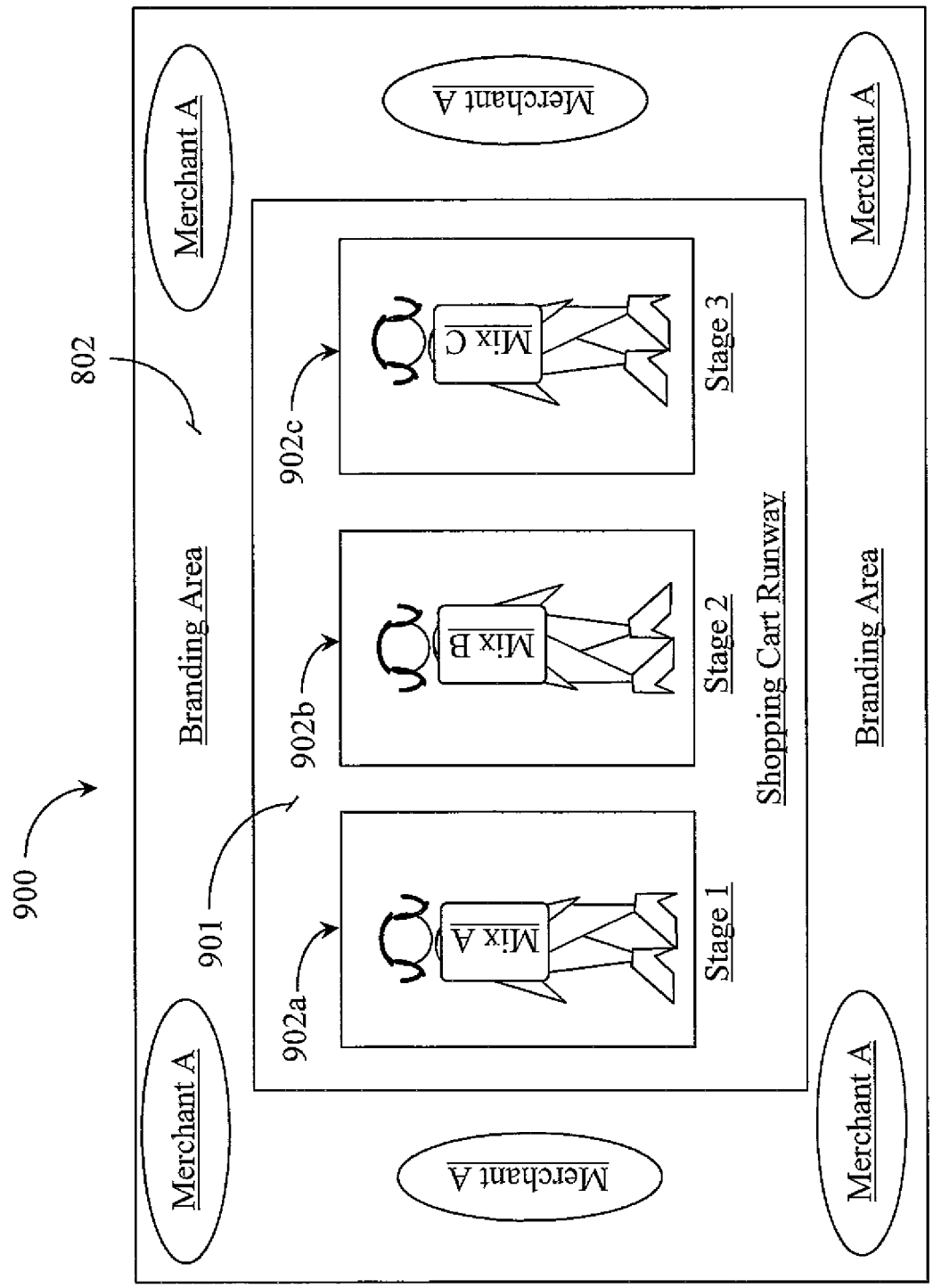
FIG. 9 illustrates a shopping cart view containing the likeness of a user modeling ensembles.

FIG. 9 illustrates a shopping cart view 900 containing the likeness of a user modeling ensembles. Shopping cart view 900 includes the branding area 802 described above. In this case, merchant A has branding rights to the cart.

In this example, instead of a simple collage view of multiple items arranged over a background image, a virtual shopping cart runway 901 is provided as a background image where a consumer may upload a likeness of herself for the purpose of actually modeling ensembles to see how they will look before purchase. In this example, there are three ensembles placed into the cart by the consumer. These are represented in this view as Mix A, Mix B, and Mix C. Although each ensemble is represented in block form here for simplicity, they may include shoes, bags, clothing items, jewelry, hats, belts, scarves, and so on.

A stage 1 (902*a*) is provided for the consumer to model Mix A. The consumer image may be one that is a full body image that strikes a pose wearing perhaps a covering over which the clothes may be superimposed. Information about the consumer can be used to resize objects and to make sure that all of the objects are orientated correctly for superimposition over the consumer anatomy. Therefore the system recognizes the consumer outline in the pose and the various anatomies of the user may be tagged to particular items. For example, the consumer's wrist may be tagged for a bracelet and the neckline for a necklace, etc. In this way when the consumer wants to add a bracelet, she may drag the image close to the wrist and the bracelet assumes the correct placement and orientation.

While a fitted look likely may not be fully achieved, a general idea of how the consumer will look wearing various ensembles can be created virtually to a level of quality that the user may rely on when making a purchase. Stage 2 (902*b*) illustrates a mirror image of the consumer image at stage 1 wearing ensemble (Mix B). Stage 3 (902*c*) illustrates the same consumer image of stage 1 wearing ensemble (Mix C).

In one embodiment, the consumer may stage a likeness of herself and then request that a merchant put together something that will look good on her. In another embodiment, the consumer may drag and drop items over her likeness and those items will install themselves to the correct image anatomy overwriting items already in place. For example, changing shoes involves dragging a desired image of a pair of shoes into position and releasing the image. The shoes align themselves over the consumer image feet, overwriting or replacing any images already there. Using transparency and overlap enables the consumer to arrange for tucked-in look or hang loose look relative to a blouse. Pant legs may be draped over shoe tops. A necklace may be partially hidden by a shirt top etc.

The consumer may also have access to a center zoom function that is installed on the consumer image enabling the consumer to get an enlarged view of specific anatomy dressed by a particular item of an ensemble. In one embodiment, frontal views, side views, and rear views of a consumer may be uploaded for modeling those specific views of the ensemble. Likewise, a three dimensional image of the consumer might be uploaded for modeling clothing items that have three dimensional views. In this way a consumer image like that on stage 1 (902*a*) may be animated and executable to "turn", for example, so the consumer gets an all around view of how an ensemble looks. A consumer image may also be uploaded for other purposes, such as decorative purposes for example. A user likeness might be uploaded simply to communicate who loaded this cart similar to a profile shot of the consumer.

In one embodiment, a consumer may upload images of the likenesses of persons for whom the consumer may be shopping. Moreover, information about those persons may be input into the system to help with color coordination and size selection. In one embodiment images of mannequins or busts maybe uploaded and fitted virtually with clothing items. In still another embodiment, a merchant may license an image of one or more famous models or personalities to use as available "virtual models" for modeling ensembles. There are a great many possibilities.

In one embodiment of the present invention a merchant may extend the branding concept into the shopping cart space by utilizing a mechanism for applying pre-designed captions or slogans over the image to mimic a lifestyle print ad that may be viewed in a fashion magazine or the like. Such captions or slogans may contain word alt and may be splashed artistically according to pre-design intent of the merchant. Items may also be captioned using the mechanism. A pool of available captions can be maintained for use when a merchant first designs a cart for consumers to use. Captions and the like may also be adjusted for transparency so as not to obstruct the consumer view of items that are visually represented by images in the cart.

In one embodiment of the present invention, a shopping cart may also be used to return specific items to a storefront where they were purchased to receive electronic credit or actual cash back through PayPal or some other payment system. This can be accomplished in a number of ways. In one way, a snapshot of the shopping cart may be taken at the time of checkout along with a transaction record and stored for later reference. The snapshot or shopping cart image may also be stored by the consumer for later use if necessary. After a user receives shipment and determines that one or more of the items were defective, never arrived, or for whatever reason should be returned, the user might click on the snapshot thus activating the cart to return items.

The user may remove the items that are not to be returned, leaving the original items that are to be returned for credit. The user may then present the cart to a merchant version of a return counter and then may proceed to return the items. The original accounting and records may easily be compared for determination of the proper return amounts. The consumer may be required to upload proof of postage that the actual items are being returned to the merchant. In one embodiment the re-activated shopping cart can be used by the consumer to return unwanted items and to purchase new items in a same shopping session. In one embodiment, electronic credits are given to a consumer returning items but account balances are not adjusted until the items have been physically received by the merchant.

It will be apparent to one with skill in the art that the e-commerce service and system of the invention may be provided using some or all of the mentioned features and components without departing from the spirit and scope of the present invention. It will also be apparent to the skilled artisan that the embodiments described above are specific examples of a single broader invention which may have greater scope than any of the singular descriptions taught. There may be many alterations made in the embodiments presented without departing from the spirit and scope of the present invention.

What is claimed is:

1. A computerized server connected to the Internet providing a method for creating a background image for sizing and orientating images of an electronic shopping cart to present a collage of images, comprising the steps:

(a) providing by the server, an initial background two dimensional image in an interactive two-dimensional shopping cart display controlled by a general-purpose computer connected to the server;

(b) adding geometric elements by a user manipulating the general purpose computer to the background image, the geometric elements added providing indication of perspective depth to a viewer of the background image;

(c) selecting a first product image from a database connected to the server, to be overlain onto the background image at a specific position in the display;

(d) providing an image selection function executable by the general-purpose computer, the image selection function enabled to select a second product image from the database to overlay on the background image, the second product image including the product in the first product image, the selection according to the position of placement of the first product image in the interactive two-dimensional display;

(e) placing the second product image in the interactive two-dimensional display at the specific position in the display, wherein the function selects the second product image and places it over the background image according to the position of placement, which provides to a viewer indication of perspective or orientation for the display.

2. The method of claim 1 wherein a decorative object image is placed in the background image and the second image is selected based upon proximity of the first image to the decorative object image.

3. The method of claim 2, wherein the first image is placed on the decorative image and the decorative image is an executable that accepts the first image, selects, renders and inserts the second image to integrate with the decorative image.

\* \* \* \* \*